Jan. 10, 1933.        E. B. STIMPSON        1,893,509
                      SLOTTING MACHINE
                   Filed Dec. 17, 1929      7 Sheets-Sheet 1

Fig. 1.

INVENTOR
Edwin B. Stimpson
BY George Ramsey
his ATTORNEY

Jan. 10, 1933.  E. B. STIMPSON  1,893,509
SLOTTING MACHINE
Filed Dec. 17, 1929   7 Sheets-Sheet 2

INVENTOR
Edwin B. Stimpson
BY George Ramsey
his ATTORNEY

Jan. 10, 1933.  E. B. STIMPSON  1,893,509
SLOTTING MACHINE
Filed Dec. 17, 1929   7 Sheets-Sheet 4

INVENTOR
Edwin B. Stimpson
BY George Ramsey
his ATTORNEY

Jan. 10, 1933.   E. B. STIMPSON   1,893,509
SLOTTING MACHINE
Filed Dec. 17, 1929   7 Sheets-Sheet 5

INVENTOR
Edwin B. Stimpson
BY
George Ramsey
his ATTORNEY

Jan. 10, 1933. E. B. STIMPSON 1,893,509
SLOTTING MACHINE
Filed Dec. 17, 1929 7 Sheets-Sheet 7

Fig. 16.
RETRACTS SPRING PRESSED LEVER WHICH CLAMPS HEADS OF RIVETS

Fig. 19.
MECHANISM FOR FEEDING RIVETS TO DIAL

Fig. 17.
ACTUATES POSITIVELY POSITIONED DIE WHICH CLAMPS SHANKS OF RIVETS

Fig. 18.
RETRACTS SPRING PRESSED DIE WHICH CLAMPS SHANKS OF RIVETS

INVENTOR
Edwin B. Stimpson
BY
George Ramsey
his ATTORNEY

Patented Jan. 10, 1933

1,893,509

UNITED STATES PATENT OFFICE

EDWIN B. STIMPSON, OF BROOKLYN, NEW YORK, ASSIGNOR TO EDWIN B. STIMPSON COMPANY, OF BROOKLYN, NEW YORK, A CORPORATION OF NEW YORK

SLOTTING MACHINE

Application filed December 17, 1929. Serial No. 414,637.

This invention relates to the slotting of blanks and will be disclosed in connection with a machine for cutting slots in rivet blanks to thereby make bifurcated rivets. The invention is, however, applicable to the slotting of blanks for other purposes.

Heretofore in the art cut bifurcated rivets have usually been made by successively feeding rivet blanks into cutting position where they are successively slotted by a rotating saw or cutter. There is a practical limit to the speed at which the saw teeth can be satisfactorily driven through the rivet blank, and this places a definite limit on the speed of operation of the machine. Attempts have been made to speed up production by successively feeding two rivets during each rotation of the cutter head and providing the cutter head with two saws or cutters positioned diametrically opposite one another to slot the two rivet blanks successively. See patent to Havener No. 1,588,576. These attempts to speed up production have not been altogether satisfactory, partly because of the difficulty of carrying out (in the types of machines used) the rivet feeding and removing operations with the required rapidity.

In the operation of a slotting machine at high speed, the saws or cutters wear rapidly and hence the machine has to be frequently shut down to replace the cutters. With the constructions of the prior art this replacing of cutters takes considerable time because the fresh cutters have to be accurately shimmed up and located on the machine while it is shut down. Accordingly, with the prior art machines considerable production time is lost in the changing of cutters.

The general object of the present invention is to provide a method of and/or a machine for slotting blanks at a high rate of speed.

Another object of the invention is to provide a slotting machine capable of operation at a high rate of speed without frequent shut downs for adjustments or replacements of parts.

Another object of the invention is to provide a slotting machine in which shimming up of replacement cutters may be effected prior to the shutting down of the machine to make the actual replacement of the cutters.

Other objects of the invention will be obvious from the following disclosures.

The invention is disclosed in connection with a machine which operates as follows: Rivet blanks to be slotted are automatically fed to a dial having a series of blank receiving recesses. This dial is rotated step-by-step, and at each step a new blank is fed to the dial. At alternate steps of the dial two blanks carried by the dial are clamped for slotting and are simultaneously slotted by a pair of saws or cutters carried by a rotating cutter head. The two saws or cutters are mounted upon a cutter holder which in turn is detachably mounted on the rotating cutter head. Fresh saws may be shimmed up in position upon a spare cutter holder, and when the machine is shut down for an interchange of saws it is only necessary to remove the cutter holder (with its saws) as a unit, and replace it with the spare cutter holder on which saws have been previously shimmed up and mounted.

General organization of the machine

Figure 1:
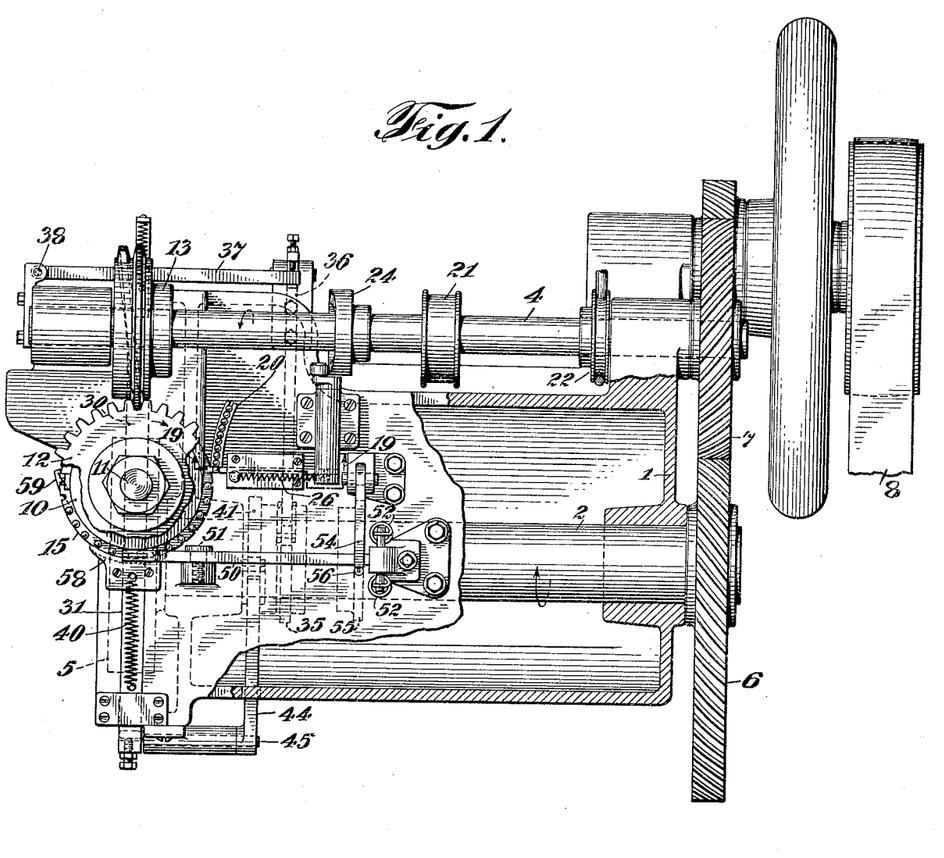
Fig. 1 of the drawings is a plan view of the machine, showing certain parts broken away.
Figure 2:
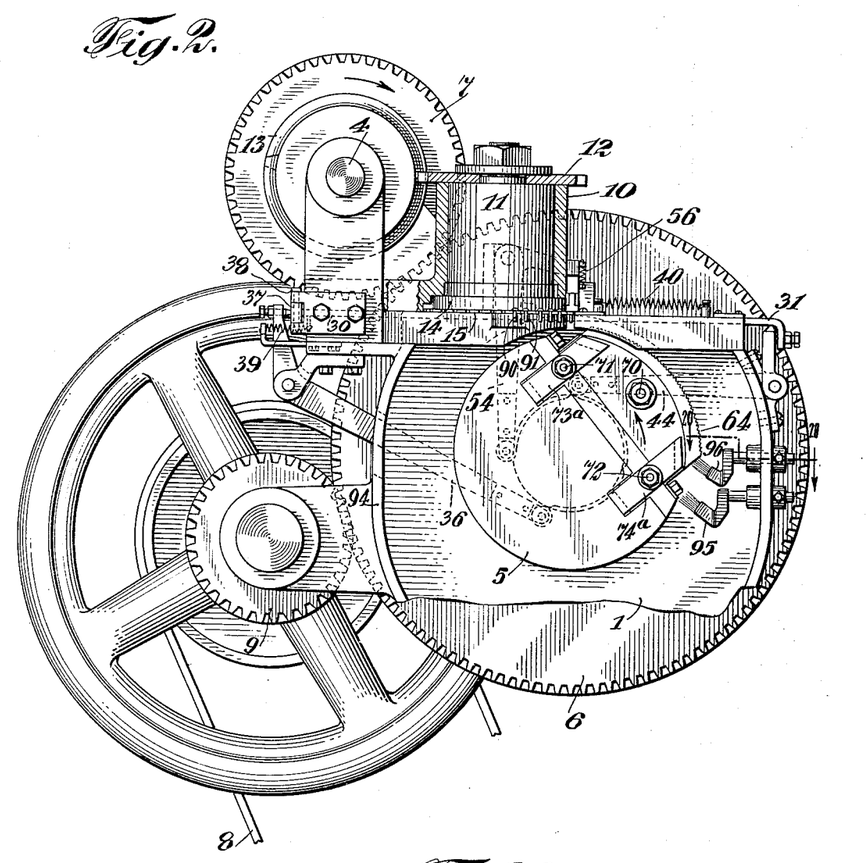
Fig. 2 is an end elevation of the machine showing the cover plate removed from the cutter chamber and various parts of the machine broken away or in section.
Figure 3:
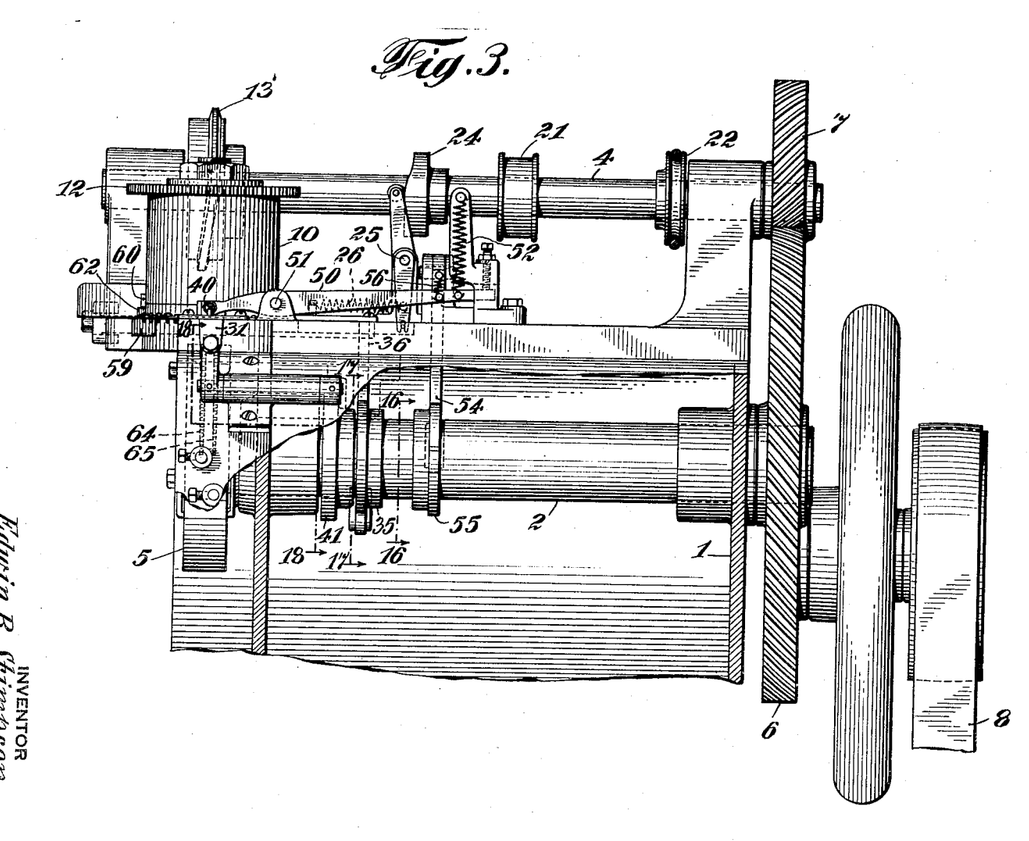
Fig. 3 is a side elevation of the machine with a portion of the frame shown as broken away.

Reference will now be had to Figs. 1, 2, and 3. The frame of the machine 1 has journaled therein a main shaft 2 and a secondary shaft 4, each of these shafts being mounted in any suitable manner that will prevent end play. One end of the main shaft 2 carries a cutter head 5 and the other end carries a gear 6 meshing with a gear 7 on secondary shaft 4. Gear 6 has twice the pitch diameter of gear 7, so that the secondary shaft 4 makes two complete rotations for each rotation of the main shaft 2. The machine is driven from any suitable source of power such as a belt 8 from which motion is transmitted to a gear 9 meshing with gear 6.

Mounted on the top of the frame of the machine is a stationary tubular head 10 (see also Fig. 4) within which there is a rotatable stub shaft 11 adapted to be driven by a worm gear 12 secured in any suitable manner to the upper end of the stub shaft 11. The lower end of the stub shaft 11 has an enlarged portion 14 to which there is secured in any suitable manner a disc 15 having a series of equally spaced recesses adapted to receive rivet blanks. This disc 15 is usually called a dial.

Meshing with the worm gear 12 there is a worm cam 13 carried by the secondary shaft 4. As shown in Fig. 1, the thread of the worm cam 13 has a straight portion which extends for nearly a half circumference and an inclined portion which extends for the remainder of the circumference. Accordingly, as the secondary shaft 4 rotates, the worm gear 12 and the dial 15 will be advanced in a step-by-step manner, being held stationary for nearly a half of each complete rotation of the shaft 4. As shown in Figs. 1 and 2, the ends of the worm thread overlap slightly and preferably this overlap is positioned at the trailing end of the straight portion of the thread of the worm.

Rivet feeding mechanism

Rivet blanks slide down an inclined raceway 20, as shown in Fig. 1. In practice the blanks are usually dumped in bulk into a hopper, with which there is associated mechanism to arrange the blanks and deliver them in proper position to the race-way 20. Such hopper mechanisms are well known in the art and form no part of the present invention and hence are not herein disclosed. It may be pointed out, however, that it is usually necessary to have some source of power to actuate the hopper mechanism and this power may be furnished either from an eccentric 21 or a grooved pulley 22 carried on the secondary shaft 4.

Figures 16, 17, 19:
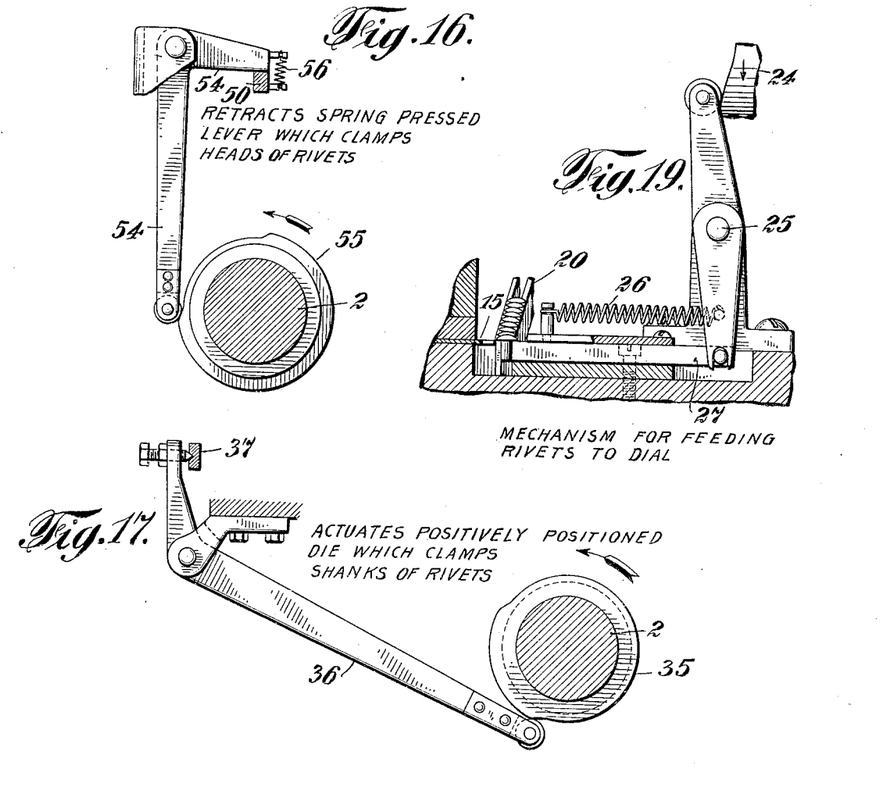
Fig. 16 is a detail view, taken on line 16—16 of Fig. 3, showing more or less diagrammatically the mechanism for retracting the spring pressed clamp which clamps the heads of the rivets while they are being slotted.
Fig. 17 is a detail view, taken on line 17—17 of Fig. 3, showing more or less diagrammatically the mechanism for positively positioning one of the dies which clamps the shanks of the rivets while they are being slotted.
Fig. 19 is a detail view taken approximately on line 19—19 of Fig. 1, showing more or less diagrammatically the mechanism for feeding the rivet blanks to the dial.

At each period of rest of the dial 15, cam 24 on shaft 4 releases rock shaft 25 (see Fig. 19) and allows spring 26 to move slide 27 to the left, thus feeding a rivet blank into a recess in the dial 15 which is positioned to receive the blank. After the rivet has been fed to the dial, cam 24 returns the rock shaft 25 and its associated parts to the position shown in Fig. 19, this return movement being carried out against the force exerted by spring 26.

Rivet clamping mechanism

Figure 4:
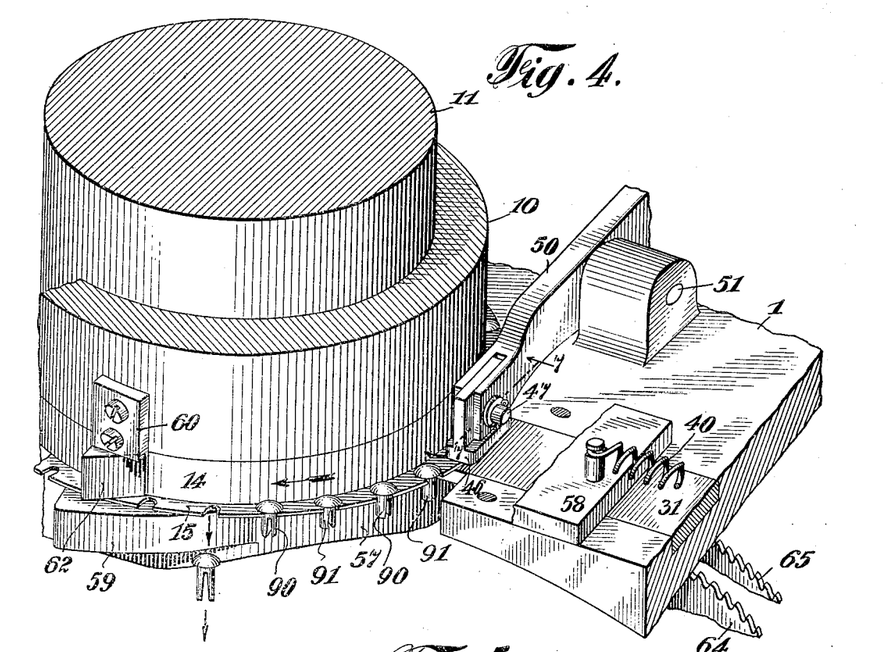
Fig. 4 is a fragmentary perspective view showing the rotating dial and certain parts associated therewith.
Figure 5:
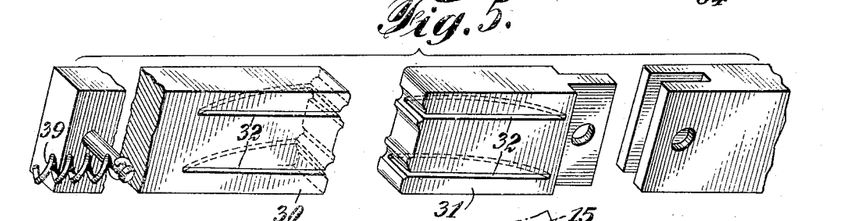
Fig. 5 is a perspective view showing the clamps for clamping the shanks of the rivet blanks when the blanks are in cutting position.
Figures 6, 7:
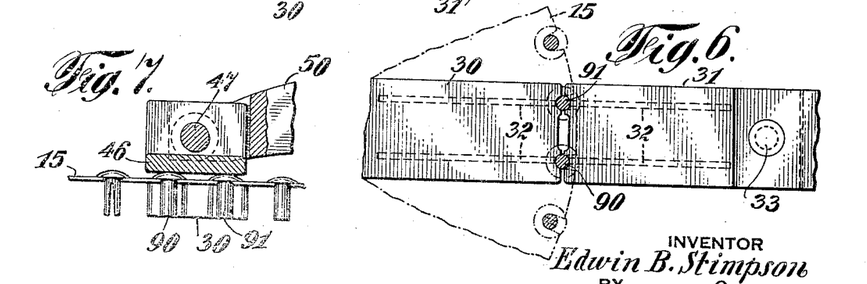
Fig. 6 is a detail plan view showing the clamping of the rivet shanks when the blanks are in cutting position.
Fig. 7 is a detail sectional view taken on line 7—7 of Fig. 4 showing primarily the clamping of the heads of the rivets when the blanks are in cutting position.

At alternate periods of rest of the dial 15, two rivet blanks carried by the dial are clamped for slotting. The shanks are clamped by two opposed slides or dies 30 and 31 (Fig. 5) which are positioned transversely of the main shaft 2 and the clamping ends of which slide beneath the edge of the dial 15, as shown in Figs. 4 and 6. The slides 30 and 31 are provided with arcuate slots 32 through which the saws pass to slot the shanks of the rivets. The clamping end of the slide 31 is pivoted at 33 to permit a slight sidewise swing which facilitates firm clamping of the two rivet shanks in cases where the shank of one rivet to be clamped is slightly larger than the shank of the other rivet to be clamped. Preferably this pivotal connection is sufficiently loose to permit slight vertical tipping of the end of slide 31 to enable it to conform to rivet shanks which may be slightly tapered.

The slide or die 30 is positively positioned to clamp the shanks of the rivets, and is spring retracted from the shanks of the rivets after the rivets have been slotted. Mounted on the main shaft 2 there is a cam 35 (Figs. 1 and 17 which actuates a cam lever 36 that is adapted to press inwardly the free end of another lever 37 (Fig. 1) pivoted at 38. The lever 37 bears against the end of slide 30 (Fig. 2), thus moving the slide 30 into position to clamp the shanks of the rivets. When the cam 35 releases the cam lever 36 and associated parts, spring 39 (Figs. 2 and 5) retracts the slide or die 30 from its clamping position. In actual practice this back and forth clamping movement of slide 30 is usually only a small fraction of an inch.

Figure 18:
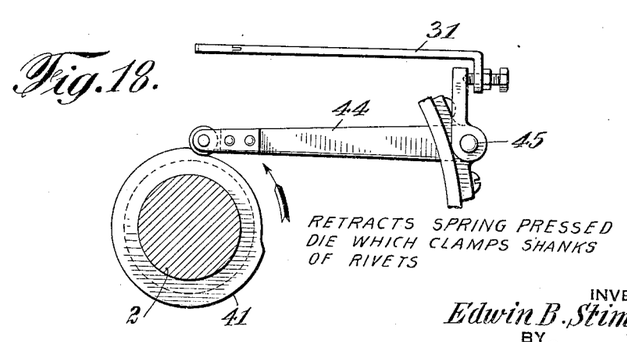
Fig. 18 is a detail view, taken on line 18—18 of Fig. 3, showing more or less diagrammatically the mechanism for retracting the other die (a spring pressed die) which clamps the shanks of the rivets while they are being slotted.

Die 31 is biased into clamping position by a strong spring 40 (Figs. 1 and 2), but normally the die is held out of clamping position by cam 41 (Figs. 1 and 18) carried by shaft 2. When the cam 41 comes to the position shown in Fig. 18 it allows cam lever 44 to descend, thereby permitting motion of rock shaft 45 to release the die 31 and permit it to be moved into clamping position by spring 40. When the slotting of the clamped rivets has been completed, cam 41 will raise cam lever 44, thus returning slide 31 to its non-clamping position.

The heads of the rivets are clamped by a clamp block 46 (see Figs. 4 and 7) pivoted at 47 to the end of a lever 50. The lever 50 is pivotally mounted at 51 and biased by strong springs 52 (Figs. 1 and 3) to urge it into clamping position. However, the lever 50 is normally held in non-clamping position by a bent cam lever 54 (Fig. 16) the horizontal arm of which is held in depressed position by a cam 55 on the main shaft 2. When the rivets are to be clamped cam 55 releases cam lever 54, thus permitting the springs 52 to elevate one end of lever 50 and press the clamp block 46 (Fig. 4) against the heads of the rivets. After the rivets have been slotted cam 55 effects the return of clamping lever 50 and clamp block 46 to non-clamping position. In order to prevent lost motion and to keep the end of the horizontal arm of cam lever 54 from moving out of engagement with lever 50 a small spring 56 is provided.

Cutter head and cutters

Figure 8:
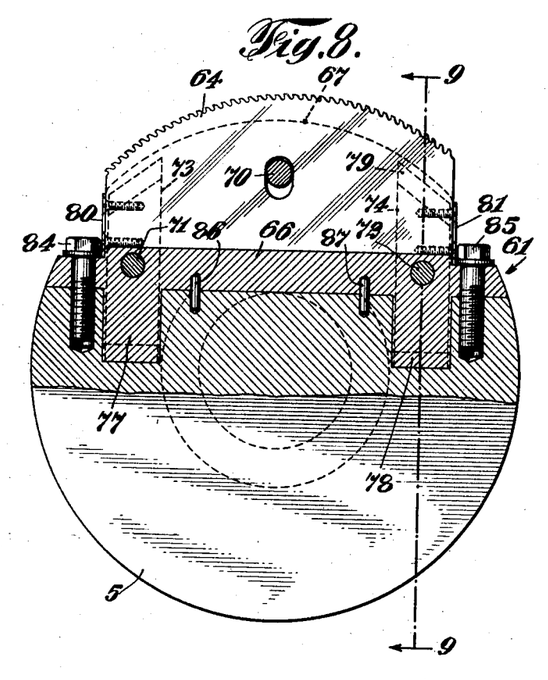
Fig. 8 is a detail view of the cutter head, etc., taken on line 8—8 of Fig. 9.
Figure 9:
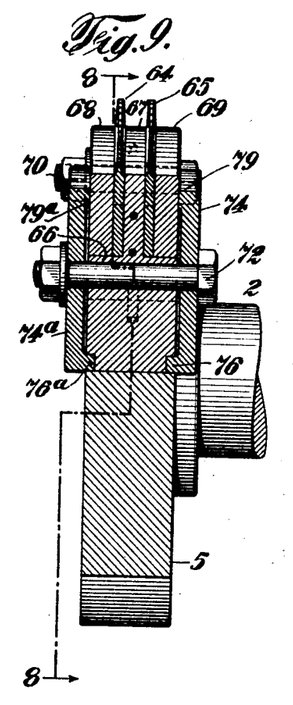
Fig. 9 is a sectional view of the cutter head, etc., taken on line 9—9 of Fig. 8.
Figure 10:
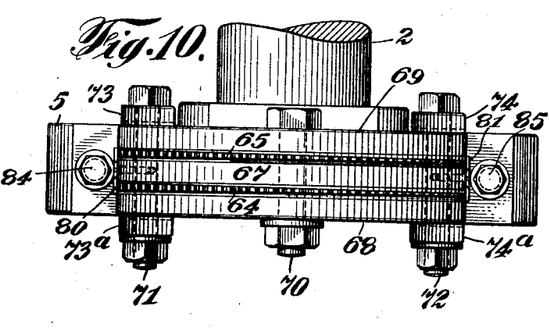
Fig. 10 is a detail plan view of the cutter head, etc.

The mechanical construction of the cutter head and cutters is best shown in Figs. 8, 9, and 10. One end of the main shaft 2 carries a cutter head 5 which is preferably forged integral with the main shaft. Detachably mounted on the cutter head is a cutter holder, designated as a whole by 61, carrying a pair of toothed cutters or saws 64 and 65. The cutter holder comprises a base 66 from the center of which projects an upstanding partition portion 67 against which the cutters 64 and 65 are clamped by means of blocks 68 and 69. The blocks 68 and 69 are held against the cutters by three bolts 70, 71, and 72. Bolt 70 passes through the blocks 68 and 69, through elongated holes in each of the cutters 64 and 65, and through the partition member 67, as shown in the drawings. Bolts 71 and 72 pass through the base 66 of the cutter holder and hold pairs of clamps 73, 73$^a$ and 74, 74$^a$ respectively against the outer surfaces of the blocks 68 and 69. These clamps have lower inwardly projecting ends as at 76, 76$^a$ which engage legs 77 and 78 that depend from the base 66 of the cutter holder. The clamps held by the bolts 71 and 72 also have inwardly projecting upper ends as at 79 and 79$^a$ so that a strong clamping pressure is exerted near the upper edges of the clamp blocks 68 and 69. The endwise position of the cutters is determined by end plates 80 and 81 which may be permanently screwed to the ends of the partition member 67.

The cutter holder 66 is accurately located on the cutter head 5 by any suitable means such as dowel pins 86 and 87 and is secured in place by any suitable means such as bolts 84 and 85. As the cutters wear and have to be sharpened, it is necessary to shim them up so that they will continue to cut the same depth of slot in the rivet blanks. The cutter holder 61 and its cutters may be removed from the cutter head as a unit, and replaced by a similar unit in which the cutters have previously been shimmed up. Thus the shimming operation can be done on spare parts before the machine is stopped for the insertion of the new cutters. This interchange of cutter holder units can be done very quickly, thus minimizing shut down time to change cutters.

Figure 11:
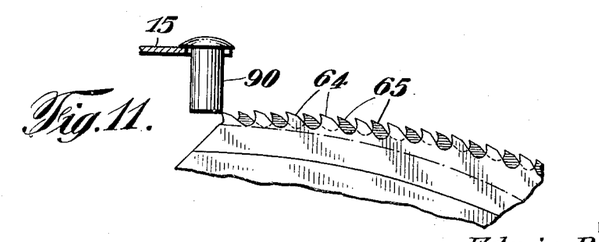
Fig. 11 is a detail elevational view showing more or less diagrammatically the preferred arrangement of the cutters, with blanks in cutting position.
Figure 12:
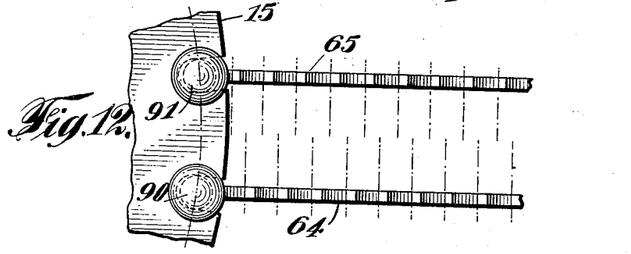
Fig. 12 is a detail plan view showing more or less diagrammatically the preferred arrangement of the cutters, with blanks in cutting position.

Preferably, the cutters 64 and 65 are arranged so that the teeth are staggered, as shown in Figs. 11 and 12. By this arrangement chips are cut alternately from a pair of clamped rivets 90 and 91, thus minimizing vibration from the cutting operation. This staggered arrangement of the teeth of the cutters can be produced by having the teeth on one cutter cut slightly in advance of the teeth on the other cutter. However, it is usually preferable to manufacture the cutters as duplicates and produce the staggering of the teeth by mounting one cutter slightly in advance of the other, rotatively speaking. Accordingly, the cutter receiving seats of the cutter holder 61 are preferably so arranged that one saw is positioned slightly in advance of the other saw.

The invention contemplates the use of more than two cutters positioned side by side on the cutter head, two cutters being shown merely by way of illustration. Where more than two cutters are used side by side, it is desirable also to so arrange the cutters that two teeth (of different cutters) do not enter the rivets at the same time. In other words, the cutters are preferably so arranged as to place the corresponding teeth of the various cutters in echelon, whether there be two cutters or more than two.

Alternative arrangement of cutters

Figures 13, 14, 15:
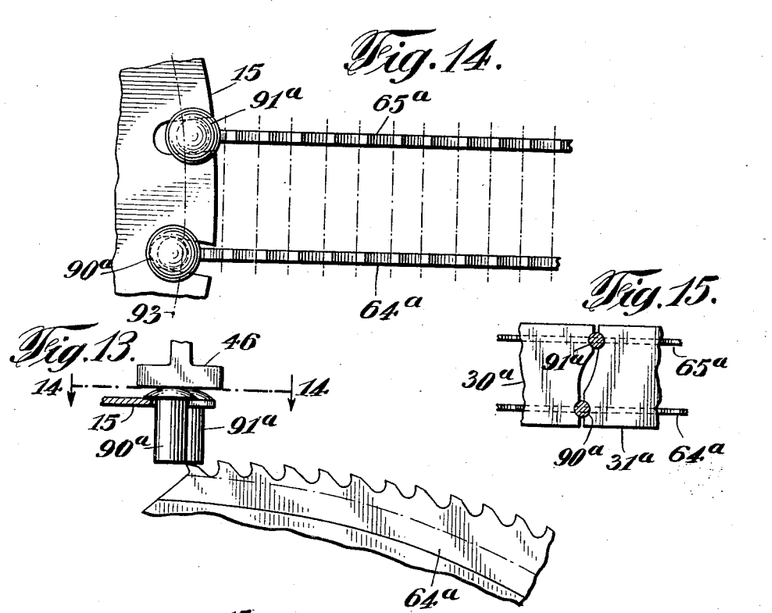
Fig. 13 is a detail elevational view showing more or less diagrammatically an alternative arrangement of the cutters, with blanks in cutting position.
Fig. 14 is a detail plan view taken on line 14—14 of Fig. 13.
Fig. 15 is a detail plan view showing clamps for clamping the rivet blanks in the position shown in Figs. 13 and 14.

As an alternative to positioning the cutter teeth in echelon as shown in Figs. 11 and 12, the cutters 64ª and 65ª may be mounted with respective teeth in alignment, as shown in Figs. 13 and 14, with the rivets to be cut, 90ª and 91ª, positioned so that chips are cut first from one rivet and then from the other rivet. The rivet receiving recesses in the dial 15 are of such depth that one rivet can be shifted slightly toward the center of the dial and the other rivet shifted slightly toward the circumference of the dial, when the rivets are clamped for slotting. In this case, the shank clamps for the rivets may be as shown in Fig. 15 in which 30ª is the positively positioned die and 31ª the spring pressed die. In clamping the rivets the shank clamps then stagger the rivets by an amount equal to half the distance between the teeth on the cutters, one rivet being shifted inwardly of its normal position on line 93 and the other rivet being shifted outwardly.

Rivet discharge mechanism

As the rivets are carried around they hang by their heads from disc 15 with their shanks traveling in an arcuate passageway between stationary frame portion 57 (Fig. 4) and other stationary parts of the machine such as block 58 (Fig. 1). This arcuate passageway terminates with block 58 and the shanks of the slotted rivets soon engage stationary cam 59 which removes the finished rivets from the dial and permits them to fall into a discharge chute (not shown). Screwed to stationary head 10 there is a block 60 having integral therewith a stationary cam 62 adjacent rotating section 14 and the upper surface of disc 15. This cam 62 acts to eject from disc 15 anything that may be lying on top of it such as a rivet head from which the shank has been broken.

Removal of chips from the cutters

Figure 20:
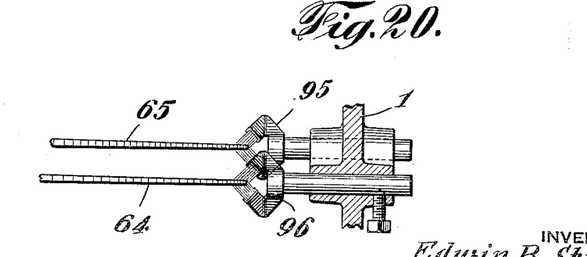
Fig. 20 is a fragmentary detail view, taken on line 20—20 of Fig. 2, showing brushes for removing chips from the cutters.

In actual practice the machine in operation is provided with a cover which lies against the rim 94 (Fig. 2) and seals off the cutter chamber to permit the forcing of lubricant over the cutters to lubricate the cutters and remove the chips therefrom. Means for so lubricating the cutters are old in the art and form no part of the present invention. Accordingly, they are omitted from the drawings for the sake of clarity. It is desirable, however, to provide mechanical means to insure the removal of the chips from the cutters. As shown in Figs. 2 and 20, there are preferably provided two pairs of opposed wire brushes at 95 and 96, one pair of brushes engaging the sides of cutter 64, and the other pair of brushes engaging the sides of cutter 65. In actual practice it is usually desirable to provide an additional set of brushes diametrically opposite those shown in Fig. 2. However, where such brushes are used they are merely duplicates of those shown and are omitted from Fig. 2 to prevent obscuring other parts of the mechanism.

It is realized that the invention may be embodied in, and carried out by, mechanisms other than those particularly disclosed, and hence the present disclosure is merely illustrative in compliance with the patent statutes and is not to be considered as limiting.

Having thus described my invention, what I claim is:—

1. A rivet slotting machine comprising a pair of toothed cutters, and means to hold a pair of rivet blanks to be slotted by the cutters, the relative position of the held blanks and the teeth of the cutters causing the cutting of individual chips to be made in the two blanks alternately.

2. A slotting machine comprising a member to be rotated having seats to receive a plurality of similarly toothed segmental cutters side by side, the seats being in slightly different angular positions to locate the respective teeth of the various cutters in echelon; and similarly toothed segmental cutters mounted in said seats.

3. A slotting machine comprising a member to be rotated having a pair of seats to receive a pair of similarly toothed segmental cutters side by side, one seat being slightly advanced rotatively with respect to the other seat to locate the teeth of the cutters in staggered relationship; and a pair of similarly toothed segmental cutters mounted in said seats.

4. A slotting machine comprising a main shaft and a secondary shaft, means to feed blanks to a slotting station, means carried by the secondary shaft to control the operation of said blank feeding means, blank holding means operable to hold blanks at the slotting station, means carried by the main shaft to control the operation of said blank holding means, and cutter means carried by the main shaft to slot the blanks.

5. A slotting machine comprising a main shaft and a secondary shaft, means to feed blanks to a slotting station, cams carried by the secondary shaft to control the operation of said blank feeding means, blank clamping means operable to clamp blanks at the slotting station, cams carried by the main shaft to control the operation of said blank clamping means, and cutter means carried by the main shaft to slot the blanks.

6. A slotting machine comprising a main shaft and a secondary shaft, a blank carrier operable to carry blanks to a slotting station, means operable by the secondary shaft to give motion to the blank carrier, spring actuated mechanism operable to feed blanks to the blank carrier, a cam carried by the secondary shaft to control the operation of said blank feeding mechanism, mechanism operable to clamp blanks at the slotting station, cams carried by the main shaft to control the operation of said blank clamping mechanism, and cutter means carried by the main shaft to slot the blanks.

7. A slotting machine comprising a main shaft and a secondary shaft, a blanket carrier operable to carry blanks to a slotting station, means operable by the secondary shaft to give motion to the blank carrier, means to feed blanks to the blank carrier, a pair of clamping dies operable to clamp blanks at the slotting station, a cam carried by the main shaft to move one of said dies into clamping position, spring means to urge the other of said dies into clamping position, a cam carried by the main shaft to retract said other die from clamping position, and cutter means carried by the main shaft to slot the blanks.

8. A rivet slotting machine comprising a carrier slotted to receive short lengths of individual rivet shanks; means to move the carrier step-by-step; clamping means operable to clamp a plurality of rivets for simultaneous slotting, and means to shift the rivets in the carrier slots to place them in staggered relation when clamped.

9. A rivet slotting machine comprising a rotary shaft; means to hold a plurality of rivets for simultaneous slotting; and a plurality of toothed segmental cutters mounted side by side on said shaft to individually slot the respective held rivets, the corresponding teeth of the various cutters being positioned in echelon and the cutting edge of each tooth of each cutter having a slightly longer radius than the cutting edge of the adjacent preceding tooth on the same cutter as measured from the axis of said shaft.

10. A rivet slotting machine comprising a plurality of toothed cutters mounted side by side, the corresponding teeth of the various cutters being positioned in echelon; means to simultaneously rotate all of the said cutters at the same speed; the teeth on each cutter having different length radii from the cutting edges of said teeth to the axis of rotation of said cutters, said radii gradually lengthening from the forward teeth to the rearward teeth of the same cutter; and means to simultaneously hold a plurality of rivets for individual slotting by respective cutters.

11. A rivet slotting machine comprising a rotary shaft, means to hold a pair of rivets for simultaneous slotting; and a pair of toothed cutters mounted side by side on said shaft to individually slot the respective held rivets; the teeth of one cutter being staggered with respect to the teeth of the companion cutter and the cutting edge of each tooth of a single cutter having a slightly longer radius from that of the adjacent preceding tooth of the same cutter as measured from the axis of rotation of said shaft.

12. A rivet slotting machine comprising means to hold a pair of rivets to be slotted, a rotary shaft, a pair of toothed segmental cutters mounted in parallel planes at right angles to the axis of rotation of said shaft, the teeth of one cutter being staggered with respect to the teeth of the other cutter, the radii of the cutting edges of succeeding teeth on a single cutter as measured from the axis of said shaft being increasingly longer for each succeeding tooth of said single cutter, and means to position a pair of rivets for each effective portion of said pair of toothed segmental cutters.

13. A rivet slotting machine comprising a rotary shaft, a pair of toothed cutters mounted side by side on said shaft, means to feed rivets to said cutters, and means to hold a pair of rivet blanks to be simultaneously slotted by the cutters, the relative position of the held blanks and the cutting edges of the teeth of the cutters causing the cutting of individual chips from the rivet blanks to be made alternately from said rivet blanks.

14. In a slotting machine, a rotatable dial having a series of blank receiving recesses, means to rotate said dial step by step, means to feed a blank to a recess in said dial for each period of rest of said dial, a rotatable shaft rotating on a stationary axis, and a pair of segmental cutters mounted on said shaft in planes at right angles to the axis of rotation of said shaft to simultaneously slot two blanks carried by said dial, and gear means operatively connecting said shaft and said dial to render said cutters effective during each successive second period of rest of said dial.

15. A slotting machine comprising a rotary cutter head, a main seat formed on said cutter head to support a cutter saw holder, a cutter saw holder having a seat adapted to cooperate with the main seat on the cutter head, said cutter saw holder being provided with partition means to separate cutter saws mounted thereon, cutter saws mounted in parallel planes on said cutter saw holder and separated predetermined distances by said partition means, saw seats on said cutter saw holder for said cutter saws, means to lock said cutter saws in accurate position on said cutter saw holder, and means for detachably clamping said cutter saw holder against said main seat on said cutter head, said cutter saw holder being so constructed and arranged that said cutter saws may be accurately mounted on said cutter saw holder prior to mounting said cutter saw holder on said rotary cutter head.

EDWIN B. STIMPSON.